United States Patent [19]

Kainer et al.

[11] Patent Number: 4,883,647

[45] Date of Patent: Nov. 28, 1989

[54] USE OF MANGANESE NODULES OR DEEP-SEA ORES CONTAINING MANGANESE FOR THE REDUCTION OF NITROGEN OXIDES IN EXHAUST GASES

[75] Inventors: Hartmut Kainer, Wiesbaden; Daniel Grimm, Schlangenbad; Wilfried Schnelle, Geseke; Peter Halbach, Clausthal-Zellerfeld, all of Fed. Rep. of Germany

[73] Assignee: Didier-Werke AG, Wiesbaden, Fed. Rep. of Germany

[21] Appl. No.: 107,483

[22] Filed: Oct. 8, 1987

[30] Foreign Application Priority Data

Oct. 10, 1986 [DE] Fed. Rep. of Germany ....... 3634553

[51] Int. Cl.$^4$ .............................................. C01B 21/00
[52] U.S. Cl. ................................... 423/239; 423/244; 423/DIG. 4; 502/200; 502/324
[58] Field of Search ............. 423/239, 244 R, DIG. 4; 502/200, 324

[56] References Cited

U.S. PATENT DOCUMENTS

| | | | |
|---|---|---|---|
| 3,723,598 | 3/1973 | Spedder et al. | 423/244 R |
| 3,880,982 | 4/1975 | Stenzel | 423/213.2 |
| 3,963,827 | 6/1976 | Acres et al. | 423/239 |
| 3,975,498 | 8/1976 | Miyazaki et al. | 423/239 |
| 4,043,939 | 8/1977 | Kasadka | 423/239 A |
| 4,044,102 | 8/1977 | Muraki et al. | 423/239 A |
| 4,164,545 | 8/1979 | Scott | 423/239 |
| 4,350,670 | 3/1982 | Matsuda et al. | 423/244 R |
| 4,351,811 | 9/1982 | Matsuda et al. | 423/239 |
| 4,692,318 | 9/1987 | Tolpin et al. | 423/244 |

FOREIGN PATENT DOCUMENTS

| | | |
|---|---|---|
| 2639848 | 8/1978 | Fed. Rep. of Germany . |
| 2824246 | 12/1978 | Fed. Rep. of Germany . |
| 2743031 | 4/1979 | Fed. Rep. of Germany . |
| 54-40278 | 3/1979 | Japan . |
| 54-52670 | 4/1979 | Japan . |

Primary Examiner—Robert L. Stoll
Assistant Examiner—Page C. Harvey
Attorney, Agent, or Firm—Nils H. Ljungman

[57] ABSTRACT

The invention relates to the use of manganese nodules or deep-sea ores containing manganese of more recent or older crustal layers as catalysts or for the manufacture of catalysts for the reduction of $NO_x$ components in exhaust gases or for the oxidation of $NO_x$ components and $SO_2$ particles in exhaust gases.

With the use of such catalysts, it becomes possible to reduce the $NO_x$ components in exhaust gases by using reduction agents such as $NH_3$ at relatively low temperatures, for example, 250° C. It is also possible to perform an oxidation reaction first in exhaust gases with the use of such catalysts, for example, with excess oxygen from NO to $NO_2$.

18 Claims, No Drawings

USE OF MANGANESE NODULES OR DEEP-SEA ORES CONTAINING MANGANESE FOR THE REDUCTION OF NITROGEN OXIDES IN EXHAUST GASES

BACKGROUND OF THE INVENTION

1. Field of the Invention

The invention relates primarily to the reduction of $NO_x$ in exhaust gases at low temperature with the use of catalysts.

2. Description of the Prior Art

DE-PS 27 43 031 describes catalysts of the prior art for the removal of nitrogen oxides in exhaust gases, which are based on metal phthalocyanines, whereby the exhaust gases are treated at temperatures above 250° C. with NO or $O_2$. DE-AS 26 39 848 also describes a process for nitrogen oxide reduction in exhaust gases by means of the addition of $NH_3$, whereby an oxide catalyst consisting essentially of hematite crystals with a defined crystal lattice is used. The above-mentioned patent is incorporated herein by reference as if the contents thereof were set forth herein in their entirety.

Generally, for the elimination of nitrogen oxides, $NO_x$, in exhaust gases with the use of catalysts, ammonia gas $NH_3$ is fed in, whereupon the nitrogen oxide reacts with the ammonia, forming nitrogen and water at temperatures of generally 350° C. to 550° C. on the catalyst surface.

OBJECT OF THE INVENTION

The object of the invention is the reduction of nitrogen oxides in exhaust gases using reduction agents, whereby a catalyst active at low temperatures can be used.

The invention achieves this object by using manganese nodules or deep-sea ores containing manganese of more recent or older crustal layers as catalyst for the manufacture of catalysts for the reduction of $NO_x$ components in exhaust gases or for the oxidation of $NO_x$ components and/or $SO_2$ components in exhaust gases or oxidation of gases, such as CO, NO and $SO_2$ to $CO_2$, $NO_2$ and $SO_3$.

SUMMARY OF THE INVENTION

The invention resides broadly in a process for removing pollutants from an exhaust gas, the process comprising the steps of: providing a bed of catalyst material for removing pollutants from an exhaust gas, passing an exhaust gas over the bed and removing at least a portion of the pollutants. The bed of catalyst material comprises a member of the group consisting essentially of: manganese nodules, deep-sea ores containing manganese and a mixture of the other members of this group.

DESCRIPTION OF THE PREFERRED EMBODIMENTS

According to a preferred embodiment, manganese nodules or deep-sea ores containing manganese of more recent or older crustal layers are used in the form of coatings or engobes of conventional catalyst carriers. Conventional catalyst carriers can be metal mesh, ceramic carriers, glass carriers, or even metal sheets.

According to another preferred embodiment, pretreated manganese nodules or pretreated dee-sea ores containing manganese are used. The pretreatment of such manganese nodules or deep-sea ores containing manganese can comprise a tempering, for example, at temperatures between 300° C. and 900° C., if necessary, in defined atmospheres containing $NO_x$, $NH_3$, $SO_2/SO_3$, and $H_2O$.

According to another preferred embodiment of the invention, doped manganese nodules or doped deep-sea ores containing manganese are used. The doping can be carried out be means of a known impregnation with nickel salts, platinum salts, cobalt salts, etc.

The use of manganese nodules or deep-sea ores containing manganese of more recent or older crustal layers according to the invention as catalysts or for the manufacture of catalysts has the advantage that the catalysts can be effective even at temperatures of $\leq 300°$ C., whereby the catalysts can also be active in the range below approximately 100° C. The maximum effectiveness of the catalysts used according to the invention is believed to be at between approximately 250° C. and 300° C.

As reduction agents for the decomposition of $NO_x$, conventional additives such as $NH_3$, CO or hydrocarbons can be added to the exhaust gas in appropriate amounts.

Another advantage of the use of manganese nodules or deep-sea ores containing manganese according to the invention is that the ores often contain natural doses of Ni, Co, Cu, Ti, Pb, and, in particular, platinum, whereby this dosing generally occurs in the oxide form in the manganese nodules or deep-sea ores.

Physical and chemical data concerning manganese nodules from the Pacific Ocean are summarized below:

The maximum size of manganese nodules is approximately 40 mm; their specific surface (BET-method) is approximately 140 $m^2/g$. The total porosity is approximately 40% by volume and the apparent density is 1.64 $g/cm^3$.

The manganese nodules have a Mn content of approximately 28 wt.%, and a Si content of approximately 6 wt.%.

These manganese nodules can, if necessary, be mechanically reduced in size by a crusher, so that the maximum grain size is 6 mm. Fines, for example, grain size of up to 2 mm, can be screened so that a bulk catalyst with a grain size from 2 to 6 mm is obtained.

However, these manganese nodules can also be ground, for example, to a grain size of less than 1 mm, and by means of a temporary binder such a polyvinyl alcohol and sulphite liquor, and with the addition of appropriate quantities of water, can be prepared as a slurry, or with the use of fine particles as a slip, which can be used as coating or engobe on conventional catalyst carriers, for example, ceramic carriers, such as Rachig rings, etc.

Deep-sea cores containing manganese of more recent or older crustal layers are generally obtained in the form of pieces, whereby they can have a grain size of up to 60 mm. These manganese ores can either be used as catalysts directly in such piece form, or after a size-reduction they can also be used, as with manganese nodules after a size reduction in the form of a coating or an engobe for conventional catalyst carriers.

Deep-sea ores containing manganese of more recent or recent crustal layers can, for example, have the following composition, whereby the information is given by elements:

|    | Maximum | Minimum | Average |             |
| -- | ------- | ------- | ------- | ----------- |
| Fe | 23      | 12      | 14.6    | % by weight |
| Mn | 39      | 11      | 23.6    | % by weight |
| Si | 10      | 1       | 3.6     | % by weight |
| Ca | 1       | 0.5     | 0.6     | % by weight |
| P  | 2       | 0.5     | 0.6     | % by weight |

Their porosity is in the order of magnitude of 30 to 65% by volume, and their specific surface is 60 to 103 m²/g.

A deep-sea ore containing manganese of older crustal layers had a specific surface of 65 m²/g, and a total porosity of 36.4% by volume.

The principal components, indicated as elements, were:

| Fe | 9.4 % by weight  |
| -- | ---------------- |
| Mn | 26.1 % by weight |
| Si | 1.3 % by weight  |
| Ca | 2.9 % by weight  |
| P  | 1.8 % by weight  |

Deep-sea ores containing manganese of older crustal layers can exhibit the following range of composition, indicated as elements, whereby these data as well as the previous data relate to ores dried at 110° C.

|    | Maximum | Minimum | Average |             |
| -- | ------- | ------- | ------- | ----------- |
| Fe | 15      | 6       | 9.3     | % by weight |
| Mn | 29      | 11      | 22.0    | % by weight |
| Si | 4       | 0.7     | 1.8     | % by weight |
| Ca | 13      | 5       | 7.8     | % by weight |
| P  | 6       | 0.8     | 3.2     | % by weight |

Manganese nodules as well as deep-sea ores containing manganese of more recent or older crustal layers are also called "marine manganiferous ores".

In relation to the the chemical compounds listed above of manganese nodules or deep-sea ores, only the primary compounds were listed. These manganese nodules or deep-sea ores often contain platinum in trace concentrations of 0.1 to 1.2 g/t, whereby this platinum is probably present in metallic form.

However, the manganese nodules or deep-sea ores always exhibit a high porosity, generally ≧25% by volume, whereby the pore distribution is favorable, since there is a large percentage of pores ≧100 nanometers, whereby a very good reaction kinetic due to a high specific surface of the catalyst or catalyst raw material may be present. The preferred material has naturally occurring pores with a portion of the pores having a diameter of less than 100 nanometers. The portion of pores having diameters comprise at least 30 percent of the total number of pores. The porosity should advantageously be at least 40% by volume, and the micropore percentage should advantageously be 40% in relation to the total porosity. The natural doses of Co, Ni, Cu, Ti, and Pb as secondary elements in such manganese nodules or deep-sea ores are generally in a concentration range of 0.1 to 2.0 wt.%.

According to the invention, the manganese nodules or deep-sea ores containing manganese of more recent of older crustal layers can also be used as oxidation catalysts. For example, they can be used to facilitate the following oxidation reactions:

$$SO_2 + \tfrac{1}{2}O_2 \rightarrow SO_3$$

$$NO + \tfrac{1}{2}O_2 \rightarrow NO_2$$

$$CO + \tfrac{1}{2}O_2 \rightarrow CO_2$$

If the catalysts are used in this manner as oxidation catalysts, following this use as an oxidation catalyst, a second step of application as a reduction catalyst can follow, for example, the following reduction reaction:

$$2NO_{1.5} + 2NH_3 \rightarrow 2N_2 + 3H_2O$$

Naturally, it is also possible to use a reduction catalyst, whereby such a reduction catalyst has a different composition form the oxidation catalyst.

The invention is explained in more detail in the following examples:

EXAMPLE 1

Natural gas was burned with excess air, whereby the exhaust gas contained 5% by volume $O_2$, 10% by volume $CO_2$, and 15% by volume $H_2O$. This exhaust gas contained approximately 1000 ppm NO, and 100 ppm $NO_2$. Approximately 1100 ppm $NH_3$ was fed into this exhaust gas, so that the ratio of $NH_3/NO = 1.0$ to 1.1.

This exhaust gas to which $NH_3$ had been added was passed through a catalyst bed of approximately 10 cm thickness at a space velocity of 6800 $h^{-1}$, whereby this catalyst comprised manganese nodules having a grain size of 2 to 4 mm.

It was found that at temperatures between 250° C. and 300° C., the $NO_x$ content was reduced by approximately 50%, while at 200° C. and 350° C., only approximately 30% of the $NO_x$ content in the exhaust gas was reduced.

Comparative Test

The method described for Example 1 was repeated under identical conditions; however, an iron oxide catalyst of the prior art was used as a catalyst. This iron oxide catalyst had a maximum activity at approximately 400° C., whereby here too, approximately 50% of the $NO_x$ content in the exhaust gas was eliminated.

The manganese nodule catalyst, as well as the iron oxide catalyst, was tempered at 400° C. for 10 h prior to use in reducing $NO_x$ components in exhaust gas.

EXAMPLE 2

The method described for Example 1 was repeated, using ore from a recent deep-sea crustal layer. A $NO_x$ reduction of approximately 70% was measured when this catalyst was used between 250° and 300° C., and a $NO_x$ reduction of 50% was measured at 350° C.

EXAMPLE 3

This example illustrates the oxidation of NO components in an exhaust gas with the addition of oxygen to $NO_2$.

Manganese ore from an old deep-sea layer was used. The exhaust gas introduced contained 1400 ppm NO, 200 ppm $NO_2$, and had an $O_2$ concentration of approximately 5 vol.%.

At 300° C., 680 ppm $NO_2$ were measured, for example, the NO content was reduced by 34.3%.

At 350° C., a $NO_2$ content of 758 ppm was measured, for example, the reduction of NO components was 39.8%.

The invention as described hereinabove in the context of the preferred embodiments is not to be taken as limited to all of the provided details thereof, since modifications and variations thereof may be made without departing from the spirit and scope of the invention.

What is claimed is:

1. A catalytic process for removing at least a portion of pollutants from an exhaust gas, said process comprising the steps of:
   providing a catalyst material for removing pollutants from the exhaust gas; and
   passing the exhaust gas over said catalyst material to thereby remove at least a portion of said pollutants;
   passing at least one additional reactant over said catalyst material, said at least one additional reactant comprising $NH_3$;
   catalytically reacting at least one of said pollutants in the exhaust gas with said at least one additional reactant;
   wherein said catalyst material comprises a member selected from the group consisting of:
   manganese nodules, deep-sea ore containing manganese and mixtures thereof; and
   wherein at least one of the following reactions:

$$SO_2 + \tfrac{1}{2}O_2 \rightarrow SO_3;$$

$$NO + \tfrac{1}{2}O_2 \rightarrow NO_2; \text{ and}$$

$$CO + \tfrac{1}{2}O_2 \rightarrow CO_2;$$

is catalyzed by the presence of said catalyst material thereby removing said portion of said pollutants from the exhaust gas.

2. The process according to claim 1, wherein said providing catalyst material comprises applying the catalyst material onto a catalyst carrier.

3. The process according to claim 1, wherein said member selected from the group consisting of manganese nodules, deep-sea ore containing manganese and mixtures thereof contains manganese in a content of at least 10 percent by weight.

4. The process according to claim 2, wherein said member selected from the group consisting of manganese nodules, deep-sea ore containing manganese and mixtures thereof contains manganese in a content of at least 10 percent by weight.

5. The process according to claim 1, wherein said catalyst material has naturally occurring pores and wherein said member selected from the group consisting of manganese nodules, deep-sea ore containing manganese and mixtures thereof, has a porosity of at least 25 percent by volume.

6. The process according to claim 4, wherein said catalyst material has naturally occurring pores and wherein said member selected from the group consisting of manganese nodules, deep-sea ore containing manganese and mixtures thereof, has a porosity of at least 25 percent by volume.

7. The process according to claim 1, wherein said catalyst material has naturally occurring pores, a portion of said pores having a diameter of less than 100 nanometers.

8. The process according to claim 7, wherein said portion of said pores having diameters of less than 100 nanometers comprise at least 30 percent of the total number of said pores.

9. The process according to claim 2, wherein said catalyst material has naturally occurring pores, a portion of said pores having a diameter of less than 100 nanometers and said portion of said pores having diameters of less than 100 nanometers comprise at least 30 percent of the total number of said pores.

10. The process according to claim 1, wherein said catalyst material is maintained at a temperature in the range of about 250° C.–400° C.

11. The process according to claim 1, wherein said members selected from said group are doped manganese nodules and doped deep-sea ores containing manganese.

12. The process according to claim 1, wherein said member selected from the group consisting of manganese nodules, deep-sea ore containing manganese and mixtures thereof, contains manganese in a content of at least 10 percent by weight, said catalyst material having naturally occurring pores, a portion of said pores having a diameter of less than 100 nanometers, and said pores having diameters of less than 100 nanometers comprise at least 30 percent of the total number of said pores.

13. The process according to claim 11, wherein said members selected from the group, contain manganese in a content of at least 10 percent by weight, said catalyst material having naturally occurring pores, a portion of said pores having a diameter of less than 100 nanometers, and said pores having diameters of less than 100 nanometers comprise at least 30 percent of the total number of pores.

14. The process according to claim 1, wherein said catalyst material comprises Fe from about 6 percent by weight to about 23 percent by weight, Mn from about 11 percent by weight to about 39 percent by weight, Si from about 1 percent by weight to about 10 percent by weight, Ca from about 0.5 percent by weight to 13 percent by weight, and P from about 0.5 percent by weight to about 6 percent by weight.

15. A catalytic process for removing at least a portion of pollutants from an exhaust gas, said process comprises the steps of:
   providing a catalyst material for removing pollutants from an exhaust gas;
   passing the exhaust gas over said catalyst material to thereby remove at least a portion of said pollutants;
   passing at least one additional reactant over said catalyst material, said at least one additional reactant comprising $NH_3$; and
   catalytically reacting at least one of said pollutants in the exhaust gas with said at least one additional reactant;
   said catalyst material comprising at least one of:
   1. manganese nodules; and
   2. a deep-sea ore containing manganese.

16. A catalytic process according to claim 1, wherein a portion of said catalyst material remains chemically unchanged by said catalyzed reactions.

17. A catalytic process according to claim 1, wherein one of said pollutants comprises NO, and wherein said $NH_3$ in said additional reactant is adjusted to produce an $NH_3/NO$ ratio of between 1.0 and 1.1.

18. A catalytic process for removing at least a portion of pollutants from an exhaust gas, said process comprising the steps of:
   providing a catalyst material for removing pollutants from the exhaust gas; and
   passing the exhaust gas over said catalyst material to thereby remove at least a portion of said pollutants;

passing at least one additional reactant over said catalyst material, said at least one additional reactant comprising $NH_3$;

catalytically reacting at least one of said pollutants in the exhaust gas with said at least one additional reactant;

wherein said catalyst material comprises a member selected from the group consisting of:

manganese nodules, deep-sea ore containing manganese and mixtures thereof;

and wherein at least one of the following reactions:

$SO_2 + \frac{1}{2}O_2 \rightarrow SO_3$;

$NO + \frac{1}{2}O_2 \rightarrow NO_2$; and $CO + \frac{1}{2}O_2 \rightarrow CO_2$;

is catalyzed by the presence of said catalyst material to remove said portion of said pollutants from the exhaust gas;

and wherein the presence of said catalyst material additionally catalyzes the following reaction:

$2NO_{1.5} + 2NH_3 \rightarrow 2N_2 + 3H_2O$.

* * * * *